United States Patent [19]

Torrington et al.

[11] 4,220,340
[45] Sep. 2, 1980

[54] CONSTANT DRAG CARRIAGE TRANSLATING MECHANISM FOR VIDEO DISC PLAYER

[75] Inventors: Leslie A. Torrington; Larry D. Huff, both of Indianapolis, Ind.

[73] Assignee: RCA Corporation, New York, N.Y.

[21] Appl. No.: 964,527

[22] Filed: Nov. 29, 1978

[51] Int. Cl.³ ............................................. G11B 25/04
[52] U.S. Cl. .................................. 274/13 R; 274/9 B; 358/128.5
[58] Field of Search ........................ 360/97; 358/128; 274/9 R, 9 B, 13 R, 14, 15 R, 23 A

[56] References Cited

U.S. PATENT DOCUMENTS

| | | | |
|---|---|---|---|
| 2,866,647 | 12/1958 | Somers | 274/13 R |
| 3,767,848 | 10/1973 | Schuller et al. | 274/13 R |
| 3,993,316 | 11/1976 | Fairbanks | 274/23 A |

FOREIGN PATENT DOCUMENTS 2455647  5/1976  Fed. Rep. of Germany ........ 274/15 R Primary Examiner—John W. Shepperd
Attorney, Agent, or Firm—E. M. Whitacre; J. S. Tripoli; D. A. Kulkarni

[57] ABSTRACT

A video record player includes a common drive belt for selectively translating a pickup stylus carriage. The player is equipped with a first drive mechanism, including a turntable-driven pulley, for utilizing the common drive belt for translating the carriage during playback toward the center of a turntable at a speed correlated to the speed of rotation of the turntable while stylus/record engagement is effected. A manually-actuated second drive mechanism is employed for utilizing the common drive belt for translating the carriage during active searching toward and away from the turntable center at a speed independent of the speed of rotation of the turntable while the stylus is in engagement with the record. The first drive mechanism includes a slip clutch interposed between the common drive belt and the turntable-driven pulley, whereby wresting of the control of the common drive belt by the manually-actuated, second drive mechanism from the first drive mechanism is permitted by the slip clutch upon actuation of the second drive mechanism. A mechanism for applying a constant drag on the turntable-driven pulley is provided to deter the rotation of the turntable-driven pulley in a reverse direction during operation of the manually-actuated, second drive mechanism in the reverse direction, whereby normal translation of the carriage by the first drive mechanism in the forward direction is resumed upon cessation of actuation of the second drive mechanism without delays due to effects of backlash in the first drive chain.

11 Claims, 13 Drawing Figures

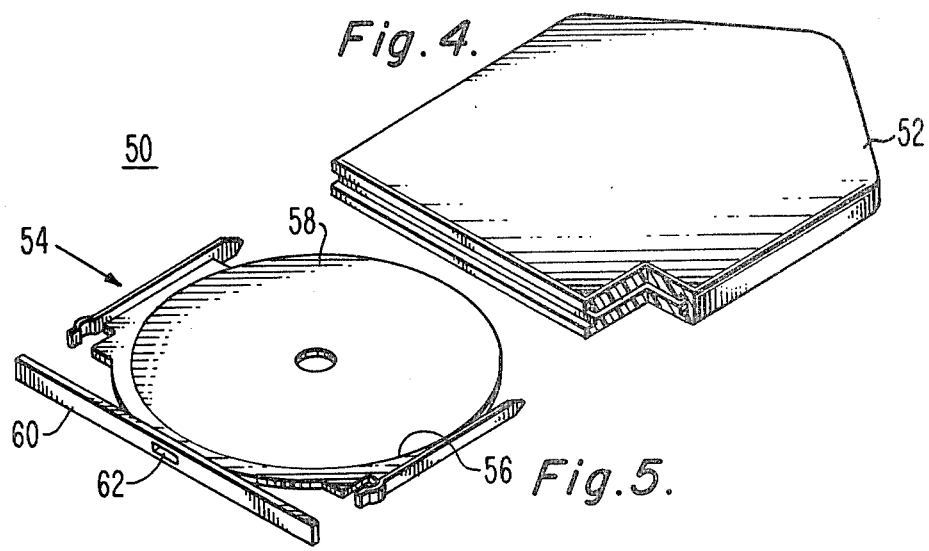
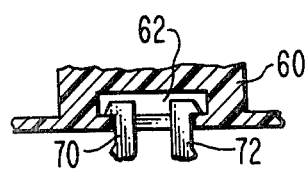
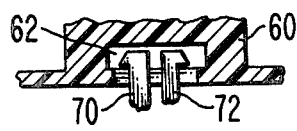
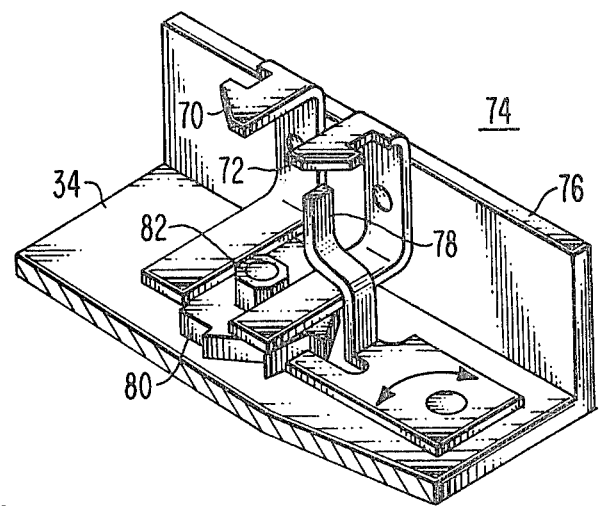
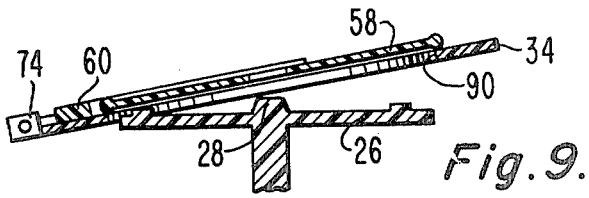
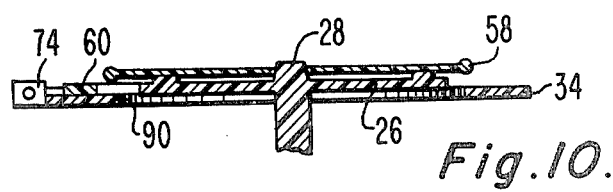

CONSTANT DRAG CARRIAGE TRANSLATING MECHANISM FOR VIDEO DISC PLAYER

This invention generally relates to video disc players, and more particularly, to player mechanisms for providing active record scanning, as well as special effects (such as frame freeze, fast forward and reverse motion).

In certain video disc systems, information is stored on a disc record in the form of geometric variations in the bottom of a continuous spiral groove disposed on the record surface. The variations in capacitance between an electrode incorporated in a groove-riding stylus and a conductive coating disposed on the record surface are sensed to reproduce the stored information. A capacitance-type video disc system is illustratively disclosed in U.S. Pat. No. 3,842,194 (Clemens).

In such systems, it is advantageous to mount a groove-riding pickup stylus in a demountable cartridge. The player is provided with rails for guiding a carriage, having a compartment for receiving the pickup cartridge, along a path. The carriage is driven during playback along the carriage guiding rails in correlation with the motion of the groove-riding stylus. U.S. Pat. No. 3,870,320 (Torrington), discloses a type of carriage translating system.

It is beneficial to enclose a record in a thin plastic caddy. For record loading, an occupied caddy is inserted into an input slot provided in the player. The player is equipped with another set of rails for guiding caddy insertion along a further path. A record extracting mechanism disposed in the player removes the record from the caddy during subsequent caddy withdrawal, whereby the record is retained in the player. The player is equipped with a platform for supporting the retained record when it is disposed in an elevated position. The retained record is transferred to the turntable for playback during motion of the platform to a depressed position. For subsequent record retrieval, the platform, with the retained record resting thereon, is raised, and an empty caddy is inserted into the player, thereby returning the record back into the caddy. Withdrawal of the caddy, effects record removal from the player. U.S. Pat. No. 4,098,511 (Leedom), and patent applications, Ser. Nos. 747,729 (Coleman), now U.S. Pat. No. 4,124,866, and 801,604 (Torrington), now U.S. Pat. No. 4,133,540, illustrate systems suitable for use with a record caddy. The above patent and applications are assigned of record to the assignee of the instant application.

In such systems, the carriage is typically mounted for side-to-side motion and the direction of caddy insertion is from front-to-back, a direction which is orthogonal to the carriage path. Such configuration imposes several constraints on player design and construction: for example, it is necessary that the starting position of the carriage is beyond the record periphery, one of the caddy guiding rails is mounted on the carriage to prevent interference thereof with the motion of the carriage toward the record center; a separate mechanism is needed to return the carriage to the starting position subsequent to playback; and a stylus landing adjustment mechanism is necessary to insure that the stylus is lowered precisely over the beginning of the recorded band during travel of the carriage from an off-record starting position toward a position overlying the record.

In a concurrently filed, copending application, Ser. No. 964,531 of L. A. Torrington, entitled "VIDEO DISC PLAYER", a novel video disc player construction, which overcomes the hereinbefore mentioned constraints, is disclosed. In the therein disclosed system, the carriage is translated along a path disposed substantially parallel to the path of caddy insertion. Pursuant to a further feature of the Torrington invention, the direction of translation of the carriage during playback is opposite to the direction of the caddy insertion. The location of the caddy path relative to the carriage path is such that the caddy engages the carriage, when the carriage is at a position other than at a starting position, during a caddy insertion to reset the carriage at the starting position. The Torrington application is assigned of record to the assignee of the instant application.

In video disc players of the type mentioned above, it is desirable to provide active disc searching, as well as special effect features (such as, stop motion, fast forward and reverse motion). In a concurrently filed, copending U.S. patent application, Ser. No. 964,534, of F. R. Stave and entitled "VIDEO DISC PLAYER HAVING MANUAL SCAN FACILITY", a carriage translating apparatus for providing active searching and special effects is described. The therein disclosed carriage translating apparatus includes a unidirectional play belt for translating the carriage toward the turntable center at a speed correlated to the turntable rotational speed, a bidirectional search belt for translating the carriage toward and away from the turntable center at a speed independent of the turntable rotational speed, and a selectively actuated apparatus for clamping one of the two belts to the carriage to effect carriage translation by a selected one of the belts to the exclusion of the other of the belts.

In a concurrently filed copending U.S. patent application, Ser. No. 964,530, of L. A. Torrington and entitled "MANUAL SCANNING MECHANISM FOR VIDEO DISC PLAYER", a modified carriage translating apparatus is described for providing manual searching and special effects without the need for two separate play and search belts and without the need for clamping and unclamping the belts. Pursuant to the Torrington invention, a common drive belt, fixedly secured to the carriage, is provided. The player is equipped with a first drive mechanism, including a turntable-driven pulley, for utilizing a common drive belt for translating the carriage during playback toward the turntable center at a speed correlated to the turntable speed. A second drive mechanism is employed for utilizing the common drive belt for translating the carriage during active scanning toward and away from the turntable center at a speed independent of the turntable rotational speed. The first drive mechanism incorporates a slip clutch interposed between a pulley which drives the common drive belt and the turntable-driven pulley, whereby wresting of control of the common drive belt by the second drive mechanism from the first drive mechanism is permitted by the slip clutch upon actuation of the second drive mechanism.

In such players, it is desirable that normal translation of the carriage toward the turntable center by virtue of the first drive mechanism resumes upon cessation of the activation of the second drive mechanism without delay due to effects of backlash in the first drive chain. In accordance with this invention, a mechanism for applying a constant drag on the turntable-driven pulley is provided for preventing a reversal in motion of the turntable-driven pulley during record scanning in the reverse direction (i.e., away from the turntable center), so that normal translation of the carriage by the first drive mechanism is instantaneously regained upon cessation of the operation of the second drive mechanism without delays due to effects of backlash in the drive chain.

IN THE DRAWINGS

FIGS. 4 and 5 depict a record caddy, comprising a jacket and a record retaining member, suitable for use with the player of FIGS. 1-3;

FIG. 6 illustrates a record extracting mechanism disposed in the player of FIGS. 1-3;

FIGS. 7 and 8 show the operation of the record extracting mechanism of FIG. 6;

Figure 1:
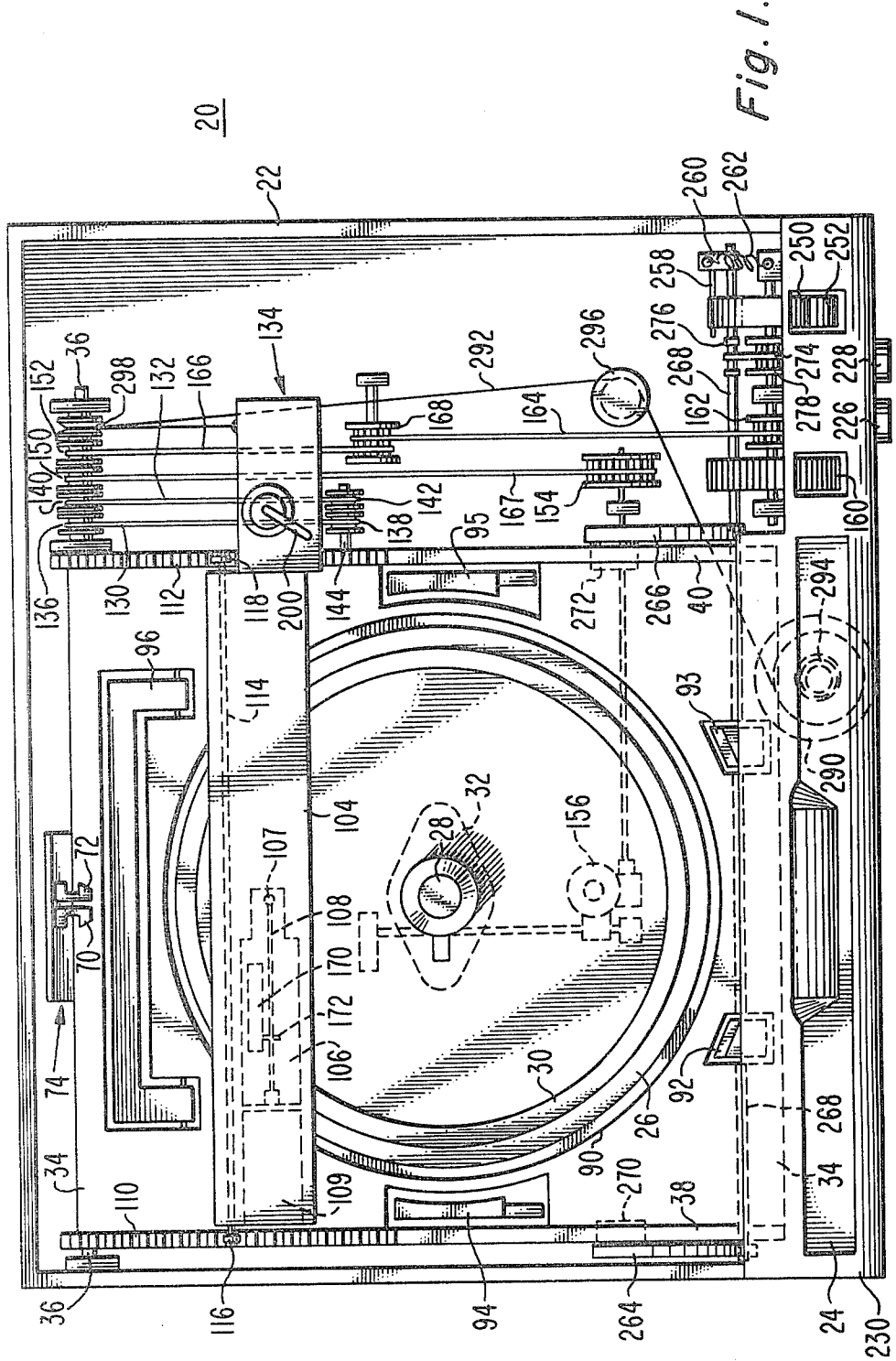
FIG. 1 is a plan view of a video record player incorporating the cartridge translating apparatus of the aforesaid Stave application.
Figure 2:
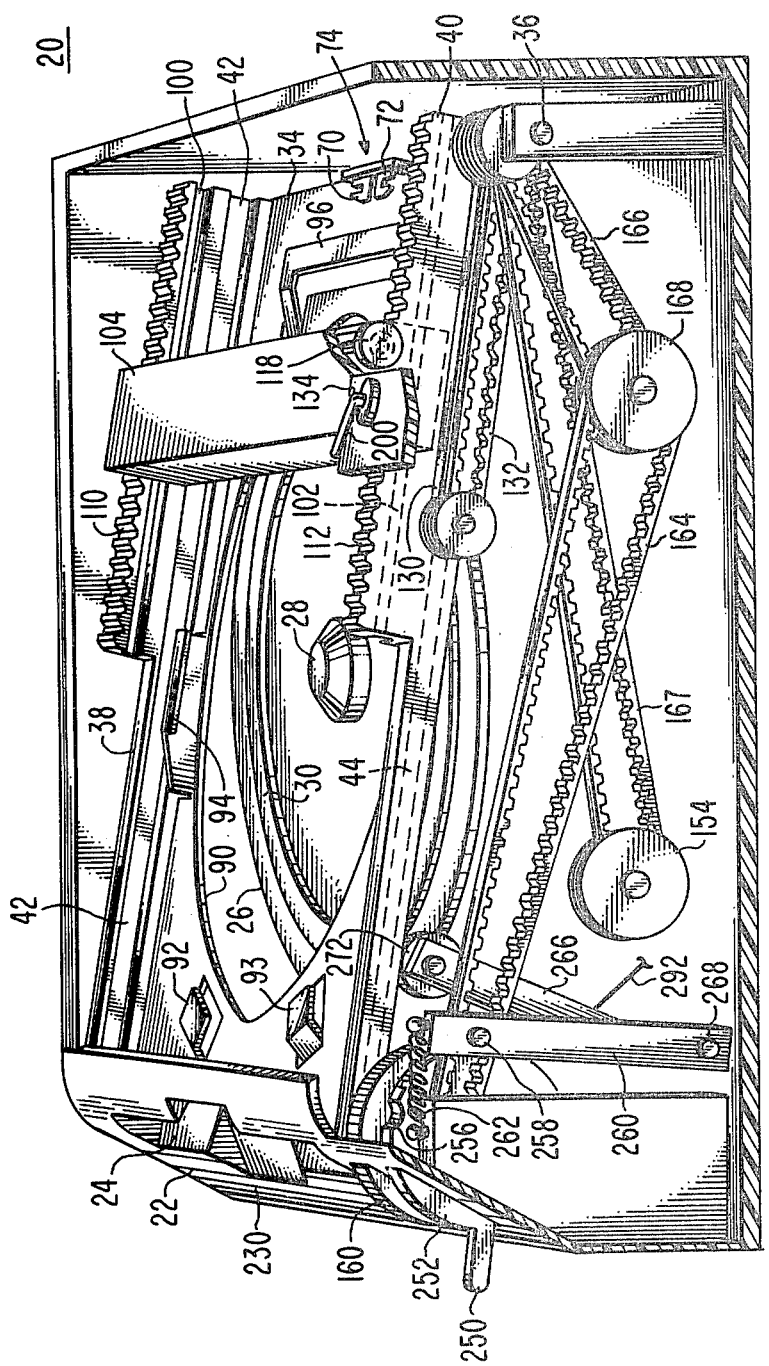
FIG. 2 is a perspective end view of the player of FIG. 1, with a depressible paltform being shown in the raised position.
Figure 3:
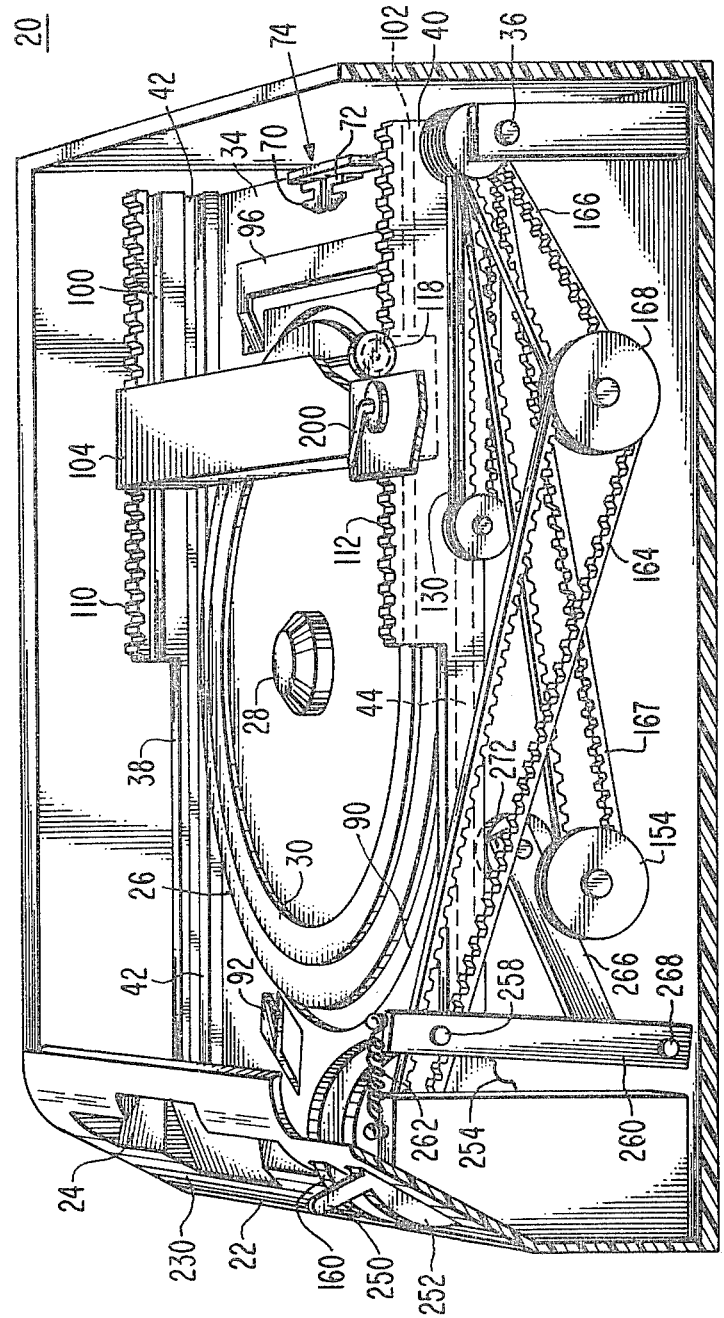
FIG. 3 is a perspective end view of the player of FIGS. 1 and 2, with the depressible platform being shown in the lowered position.
Figure 11:
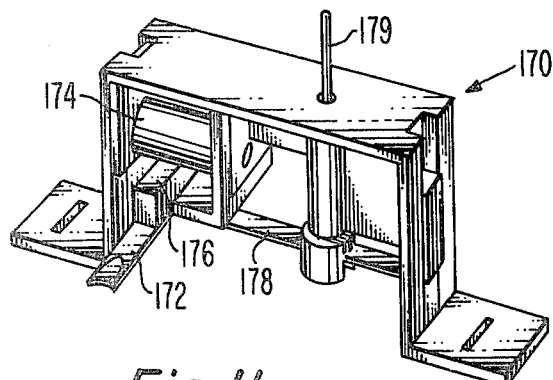
Figure 12:
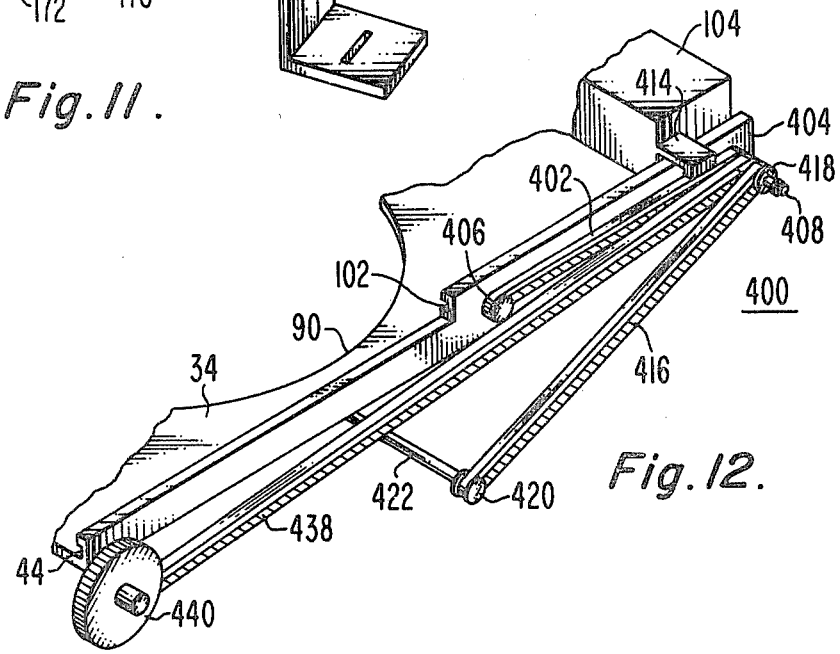
Figure 13:
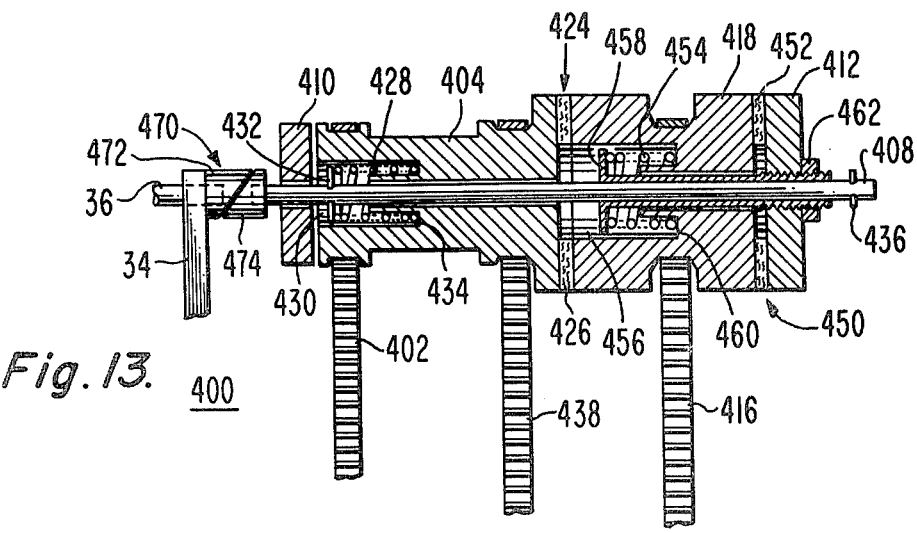

FIGS. 9 and 10 demonstrate the sequence involved in transferring a record, resting on the depressible platform of FIGS. 1-3, to the player turntable;

FIG. 11 illustrates a stylus lifting/lowering apparatus suitable for use with the player of FIGS. 1-3;

FIG. 12 illustrates a novel carriage translating mechanism pursuant to the principles of the present invention, and which can be substituted for the carriage translating mechanism disclosed in the abovesaid Stave application in the player of FIGS. 1-3; and FIG. 13 shows a cross-sectional view of a portion of the carriage translating mechanism of FIG. 12.

In FIGS. 1, 2 and 3, a video disc player 20 (incorporating the carriage translating mechanism of the aforesaid Stave application) includes a housing 22 which is provided with an input slot 24 at the front end thereof, through which a record caddy is inserted for loading an enclosed record into the player. A turntable 26 includes a record centering spindle 28, and a soft annular pad 30 for supporting the record. The turntable diameter is made less than the record diameter, and the soft annular pad supports the record in the grooved area.

The turntable 26 is driven by a motor 32 (FIG. 1) to rotate at a predetermined speed within preset limits (e.g., 450 rpm±0.01%). U.S. Pat. No. 3,912,283 (Hammond, et al.), discloses an alternate form of a turntable drive system.

A platform 34, mounted on a shaft 36 which is located at the non-input end of the housing 22, is subject to motion between an elevated position (FIG. 2) and a depressed position (FIG. 3). A pair of rails 38 and 40 are disposed on the platform 34. The rails have grooves 42 and 44 for guiding insertion of a caddy into the housing along a path. The front ends of the caddy guiding grooves are aligned with the input slot 24 when the platform is occupying the elevated position for permitting insertion of a caddy into the player.

As shown in FIGS. 4 and 5, the record caddy 50 comprises an outer jacket 52 and a record retaining member 54 removably located within the jacket. The retaining member comprises (1) an annular portion 56, that encircles the enclosed record 58, and (2) a spine portion 60, which serves as a closure to keep dust and debris from entering the record enclosing cavity. The spine has an opening 62 into which the latch arms 70 and 72 of a record extracting mechanism 74 (FIG. 1) protrude during arrival of a record caddy at a fully inserted position in the player to effect record removal during subsequent caddy withdrawal.

The record extracting mechanism 74 is mounted on the platform 34. In the manner shown in FIG. 6, the extracting mechanism 74 includes latch arms 70 and 72 pivotally secured to a platform-mounted bracket 76. The latch arms are alternated between an open condition (FIGS. 6 and 7) and a closed condition (FIG. 8), in response to each caddy arrival at the fully inserted position in the player. The arrangement for rendering the extracting mechanism caddy responsive includes a pivotally-mounted actuating arm 78 disposed in the caddy path. The actuating arm advances a ratchet 80, carrying a square-shaped cam 82, through 45 degrees each time a cover arrives at a fully inserted position in the player. Each advancement of the square-shaped cam changes the condition of latch arms from the condition they occupied prior to cover insertion to the other condition thereof. Springs (not shown) are provided for returning the actuating arm to the rest position thereof, and to bias the latch arms into engagement with the square-shaped cam 82. A pawl (not shown) is provided to prevent the ratchet from rotating in the reverse direction when the actuating arm is returned to its rest position. U.S. Pat. No. 4,109,919 (Elliott, et al.), discloses a suitable caddy-actuated record extracting mechanism.

To load a record into the player, the latch arms 70 and 72 are disposed in the closed condition (FIG. 8), the platform 34 is disposed in the elevated position (FIG. 2) and an occupied caddy is inserted through the input slot 24 along the caddy guiding grooves 42 and 44. The latch arms enter the opening 62 in the spine 60 as the caddy reaches the fully inserted position in the player. The engagement of the caddy with the actuating arm 78 indexes the latch arms into the spread apart condition (FIG. 7), whereby the retaining member and the associated record are locked to the platform. Subsequent withdrawal of the caddy removes the record therefrom, thereby retaining the record in the player resting on the raised platform (FIG. 9). To transfer the retained record to the turntable, the platform is lowered to the depressed position (FIG. 10).

For record retrieval, the above sequence is reversed. The platform, with the record resting thereon, is raised (FIG. 9). The inner diameter of an opening 90 in the platform 34 is sufficiently less than the record diameter to positively insure lifting of the retained record during upward motion of the platform. The platform is provided with a set of depressible lifting pads 92, 93, 94, 95 and 96 (FIG. 1) to align the record resting thereon with the caddy guiding grooves 42 and 44 to cause return of the record into an empty caddy during insertion thereof into the player. As a caddy is loaded into the player, the leading edge thereof depresses the lifting pads to allow forward motion of the caddy. The engagement of the caddy with the actuating arm 78 reindexes the latch arms to the closed condition (FIG. 8), thereby freeing the record from the player. Subsequent caddy withdrawal removes the enclosed record therewith.

The rails 38 and 40 are further provided with a second set of grooves 100 and 102 (FIGS. 2 and 3) for guiding a carriage 104 along a second path parallel to the caddy path (front-and-back). The carriage is provided with a pair of projections (not shown), which are respectively received in the carriage guiding grooves.

A pickup cartridge 106, carrying a groove-riding stylus 107 at the end of a stylus arm 108, is installed in a compartment provided in the carriage 104 (FIG. 1). The carriage is translated during playback along the rails toward the turntable center (a direction opposite to the direction of caddy insertion) in correlation with the speed of rotation of the turntable in the manner hereinafter described. An armstretcher apparatus 109 oscillates the pickup stylus back-and-forth along the groove so as to offset cyclical errors in stylus/record relative velocity. U.S. Pat. No. 4,030,124 (Allen), discloses a pickup cartridge suitable for use with the player described herein. A suitable armstretcher apparatus is shown in U.S. Pat. No. 3,983,318 (Miller, et al.).

A pair of racks 110 and 112 are respectively secured to the platform rails 38 and 40. A shaft 114, carrying a set of pinions 116 and 118, is rotatably secured to the carriage 104 (FIG. 1). A respective one of the pinions engage a respective one of the racks to ensure that the carriage path lies radially of a turntable-supported record throughout the operating range thereof.

Prior to playback, the carriage is restored to a starting position. The resetting of the carriage to the starting position is done automatically when a caddy is inserted, for example, to retrieve a record, resting on the platform while it is disposed in the raised position, from the player. The location of the caddy path relative to the carriage path is such that a caddy engages the carriage during insertion thereof into the player. The player is dimensioned such that the arrival of the carriage-engaging caddy at the fully inserted position in the player coincides with the arrival of the engaged carriage at the starting position.

For playback, the platform, with a retained record resting thereon, is depressed to transfer the record to the turntable. The carriage is translated during playback along the rails in a direction opposite to the direction of caddy insertion in correlation with the speed of rotation of the turntable. In addition to normal correlated translation of the carriage during playback, the carriage is translatable in either direction at a speed independent of the speed of rotation of the turntable during active search.

The carriage drive mechanism includes an endless play belt 130, an endless search belt 132 and a carriage-mounted, mechanical toggle switch 134 (FIG. 1). The toggle switch selectively connects one of the two belts to the carriage to effect carriage translation by a selected one of the belts. The play belt is driven in correlation with the turntable rotational speed, and in a direction causing carriage translation toward the record center. The search belt is driven independent of the turntable rotational speed, and in either direction. The belts are driven in the manner described hereinafter. The play belt is disposed about a pair of pulleys 136 and 138, and the search belt is disposed about an additional set of pulleys 140 and 142. Pulleys 136 and 140 are loosely mounted on the platform shaft 36 for motion independent thereof. The other pulleys 138 and 142, serving as idling members, are freely mounted for rotation about a pin 144 secured to the platform 34, and extending parallel to the platform shaft 36. The respective locations of the pulleys are such that the belts lie along a path parallel to the carriage path.

The mechanisms for driving the two belts will now be described. As shown in FIG. 1, a turntable-driven pulley 150 and a thumbwheel-driven pulley 152 are also loosely mounted on the platform shaft 36 for motion independent thereof. The play belt driving pulley 136 and the search belt driving pulley 140 are respectively secured to the turntable-driven pulley 150 and the thumbwheel-driven pulley 152 for rotation therewith.

The turntable-driven pulley 150 is coupled to a pulley 154 which, in turn, is driven by the turntable drive motor 32 via a drive chain 156. The selection of proper gear ratios permits carriage translation in correlation with the radial motion of the groove-riding stylus during playback.

A serrated thumbwheel 160 is rotatably mounted in the housing 22, and has a portion, which is accessible to the user of the player through a slot in the front instrument panel 230 of the player. A pulley 162 is mounted coaxially with the thumbwheel for rotation therewith. The coaxially mounted pulley drives the thumbwheel-driven pulley 152 by means of endless belts 164 and 166 via an intermediate pulley 168. It will be seen that the speed of the bidirectional search belt is continuously variable over a range of speeds in either direction by utilizing the manually-actuated thumbwheel. All of the endless belts and the pulleys herein used are equipped with teeth to provide nonslip coupling.

An apparatus 170 (FIGS. 1 and 11) for causing motion of the pickup stylus between a lowered position, permitting engagement between the stylus and a turntable-supported record, and a raised position, precluding stylus/record engagement, is mounted in the carriage 104. The pickup stylus is lowered for engagement with a turntable-supported record during playback and active search. The pickup stylus is raised when the player is in a pause mode and when the carriage reaches an end-of-play position.

Essentially, as shown in FIG. 11, the stylus lifting/lowering apparatus 170 includes a stylus arm rest 172 mounted for motion between an elevated position and a depressed position. The stylus arm rest in the elevated position supports the stylus arm 108 (FIG. 1) in a manner precluding stylus/record contact. The stylus arm rest in the depressed position permits the stylus arm to occupy a lowered position. The lowered position of the stylus arm is such that the stylus/record contact is established when the carriage is in the over-record play position. An electromagnet 174 is energized to repel a permanent magnet 176 secured to the stylus arm rest to dispose the stylus arm rest in the depressed position. A leaf spring 178 secured to the stylus arm rest lifts the stylus 107 off the record when the electromagnet is de-energized. A selectively actuated plunger 179 depresses the stylus arm rest when actuated. U.S. Pat. No. 4,053,161 (Bleazey, et al.), discloses such stylus lifting/lowering apparatus.

Disposed in the carriage are pickup circuits coupled to the output of the groove-riding stylus for developing a signal representative of the information stored on the turntable-supported record. Signal processing circuits, coupled to the output of the pickup circuits, are located in the housing for developing a signal suitable for application to a television receiver for audio/visual presentation of the information stored on the record. U.S. Pat. No. 4,080,625 (Kawamoto, et al.), discloses suitable pickup circuits. U.S. Pat. No. 4,097,899 (Yu), illustratively describes signal processing circuits.

To obtain various special effects, the mechanical toggle switch 134 is thrown into an active search mode to connect the carriage to the variable speed, bidirectional search belt 132 to the exclusion of the constant speed, unidirectional play belt 130. It will be noted that in the active search mode, as well as in the play mode, the stylus lifting/lowering apparatus permits stylus/record engagement. To realize, for example, fast forward motion, the carriage is translated at a rapid rate in the forward direction by rotating the thumbwheel 160 at appropriate speed in the required direction, while the stylus is allowed to ride on the record. The reverse motion can be obtained by translating the carriage in the reverse direction (i.e., away from the turntable center or toward the starting position). To obtain stop motion effect, the carriage is allowed to remain stationary, thereby causing the groove-riding stylus to repetitively trace a selected set of groove convolutions.

The platform lifting/lowering mechanism will now be described in conjunction with FIGS. 1-3. A function selection lever 250 secured to a rotatably mounted wheel 252, extends through a slot provided in the front instrument panel of the player. The function selection lever is moved to the positions shown in FIGS. 2 and 3, respectively, to raise and lower the platform. In the raised position of the platform, the front ends of the caddy guiding grooves 42 and 44 are aligned with the input slot to permit caddy insertion and extraction. The depression of the platform, with a retained record resting thereon, effects transfer of the retained record to the turntable for playback. The function selection lever may also serve to shut off power to the player, for example, when it is shifted to a position beyond the caddy in/out position (FIG. 2).

The function selection wheel is provided with peripheral, axial notches 254 and 256 corresponding to the raised and lowered position of the platform. A detent 258, secured to a pivotally mounted lever 260, is received in one of the notches to releasably hold the function selection wheel in a selected one of the positions thereof. A spring 262 urges engagement between the detent and the periphery of the function selection wheel 252.

The linkage between the function selection lever and the platform includes a pair of spaced levers 264 and 266 secured to a rotatably mounted shaft 268. A set of platform-engaging rollers 270 and 272 are respectively disposed at the free ends of the spaced levers. As shown in FIG. 1, an endless toothed belt 274 is disposed about a toothed pulley 276, securely mounted on the shaft 268, and another toothed pulley 278, mounted coaxially with the function selection wheel for rotation therewith. The relative angular location of the spaced levers 264 and 266 is such that the motion of the function selection lever between the two positions causes corresponding motion of the platform between the elevated and the depressed position.

A rotatably-mounted dial 290 (FIG. 1), bearing an indicia indicative of the respective playing times associated with distance traveled by the carriage from a starting position, is visible through a readout window provided in the front instrument panel of the player. A cord 292 extends between the carriage 104 and the indicia bearing dial such that the displacement of the carriage along the guiding rails effects synchronized rotation of the dial. A torsion spring 294 is disposed about the axis of rotation of the dial such that it gets coiled during translation of the carriage away from the starting position, whereby energy is stored in the torsion spring. The coiled spring applies a force to the carriage in a sense urging carriage travel toward the starting position. The applied force aids resetting of the carriage to the starting position, when it is at a position other than the starting position, during a caddy insertion. The cord 292 is passed over a grooved pulley 296 and another grooved pulley 298. The pulley 298 is coaxially mounted on the platform shaft. One end of the cord is fastened to the carriage-mounted block 180 and a portion at the other end thereof is wrapped around the stem portion of the dial. The stiffness of the torsion spring is selected to give the desired feel to the user of the player as he inserts a caddy into the player to restore the carriage to the starting position.

The input slot is covered with a flap for keeping dust and debris from entering the record chamber in the player. When the player is disposed in the caddy in/out mode (FIG. 2) by means of the function selection lever, the flap uncovers the input slot to allow caddy insertion and extraction. In other modes of the player, the flap remains closed.

It will be noted that both the caddy guiding grooves and the carriage guiding grooves are integrally molded with the platform to provide a single-main-frame construction. This permits a precise positioning of the caddy relative to the carriage and the carriage relative to the turntable throughout the operating range.

The mounting of the play belt driving pulley 136, the search belt driving pulley 140, the turntable-driven pulley 150, the thumbwheel-driven pulley 152 and the grooved pulley 298 on the platform shaft 36 permits platform motion without disturbing the rest of the player system.

Shown in FIGS. 12 and 13 is a novel carriage translating mechanism 400, built in accordance with the instant invention, for providing active scanning and special effect features. The novel carriage translating mechanism is suitable for substitution in place of the carriage translating mechanism of the aforesaid Stave application in the player of FIGS. 1-3. The advantages of the novel carriage translating mechanism are that it eliminates the need for separate play and search belts, and the need for clamping and unclamping of these belts.

As shown in FIGS. 12 and 13, the platform 34 is pivotally mounted about the shaft 36. It will be seen that the platform rail 40 is provided with the caddy guiding groove 44 and the carriage guiding groove 102. The pickup carriage 104 is slidably mounted on the platform for translation along a path lying substantially parallel to the caddy path in the manner hereinbefore discussed. For reasons of clarity, the rack and pinion arrangement (shown in FIGS. 1-3) for assuring radial translation of the pickup carriage is not illustrated in FIG. 12.

The novel carriage translating mechanism includes a common drive belt 402 disposed about a carriage driving pulley 404 and an idler pulley 406. The carriage driving pulley 404 is loosely mounted on a shaft 408 for rotation independent thereof. A pair of spaced members 410 and 412, secured to the housing of the player, support the shaft 408 coaxially with the platform shaft 36 for translation along a path parallel to the common axis. The idler pulley 406 is rotatably mounted about a pin secured to the platform. The carriage is fixedly secured to the common drive belt 402 by a clamp 414.

A first drive mechanism for translating the carriage during playback toward the turntable center at a speed correlated to the speed of rotation of the turntable (while the stylus lifting/lowering apparatus permits stylus/record engagement) includes an endless play belt 416 disposed about a turntable driven pulley 418 and a second idler pulley 420. The turntable driven pulley 418 is loosely mounted on the coaxial shaft 408 for motion independent thereof. The idler pulley 420 is driven by the turntable motor, via another drive chain 422, to rotate at a speed which causes the carriage to move in synchronism with the groove-riding pickup stylus during playback. The turntable driven pulley 418 drives the carriage driving pulley 404 via a slip clutch 424 (FIG. 13). The slip clutch 424 comprises a friction plate 426 fixedly secured to the turntable driven pulley 418 and a coil spring 428 disposed about the coaxial shaft 408 to urge engagement between the carriage driving pulley 404 and the friction plate. The coil spring 428 is seated in a recess 430 provided in the carriage driving pulley 404, and is interposed between a retainer 432 securely mounted on the coaxial shaft 408 and a shoulder portion 434 of the recess. A second retainer 436 is secured at the other end of the coaxial shaft 408 to limit axial movement thereof within a given range.

A second drive mechanism for translating the carriage (during, for example, active searching) toward and away from the turntable center at a speed independent of the turntable rotational speed (while the stylus lifting/lowering apparatus allows stylus/record engagement) includes an endless search belt 438 disposed about another portion of carriage driving pulley 404 and a pulley (not shown) mounted coaxially with a rotatably mounted, serrated thumbwheel 440 for rotation therewith. All the endless belts and pulleys herein used are equipped with teeth to provide a nonslip coupling between the respective members.

For active scanning, the carriage 104 can be translated at a speed variable over a range of speeds, and in either direction, by appropriately turning the thumbwheel 440 (while stylus/record engagement is permitted by the stylus lifting/lowering apparatus). The slip clutch 424 allows wresting of control of the common drive belt 402 by the thumbwheel 440, from the first drive mechanism, when the thumbwheel is manually turned. Additionally, the slip clutch permits restoration of the carriage 104 to the starting position, when the carriage is at a position other than the starting position, during a caddy insertion.

It is desirable that translation of the carriage toward the turntable center by virtue of the first drive mechanism resumes upon cessation of operation of the thumbwheel without delay due to effects of backlash in the first drive mechanism. Any delay in resumption of the normal tracking movement of the carriage upon cessation of active searching is annoying to the listener/viewer. To provide a substantially instant resumption of playback, a drag mechanism 450 is provided. The drag mechanism 450 comprises a second friction plate 452 fixedly secured to the support member 412 and a second coil spring 454 disposed about the coaxial shaft 408 to urge contact between the turntable driven pulley 418 and the friction plate. The coil spring 454 is seated in a cavity 456 provided in the turntable driven pulley 418, and is interposed between a flange portion of an adjustable retaining sleeve 458 and a base portion 460 of the cavity. The position of the retaining sleeve 458 with respect to the support member 412 (and hence the force with which the turntable driven pulley 418 is applied against the friction plate 452) is variably adjusted by means of a nut 462 cooperating with the peripheral threads disposed on the stem portion of the retaining sleeve. The applied force is adjusted to a level such that the drag torque (due to friction between the turntable driven pulley 418 and the friction plate 452) exceeds the torque developed between the carriage driving pulley 404 and the turntable driven pulley via the slip clutch 424, thereby preventing reverse rotation of the turntable driven pulley due to effects of backlash, when the carriage driving pulley is rotated in the reverse direction by the thumbwheel 440 to cause the carriage to move away from the turntable center. The normal translation of the carriage is hence instantaneously resumed without delay when the thumbwheel 440 is released.

In such players, where the caddy pushes the carriage back to the starting position, it is desirable, as previously indicated, to reduce the force required to reset the carriage, and to provide a neutral, free flowing feel to the user of the player during such caddy insertion. The dial mechanism hereinbefore disclosed serves to, in addition to indicating the radial position of the carriage, aid restoration of carriage to the starting position during a caddy insertion. When the novel carriage translating mechanism 400 is employed in place of the carriage translating mechanism of the aforesaid Stave application in the player of FIGS. 1-3, the thumbwheel 440 which is fixedly coupled to the carriage 104 can be marked with appropriate indicia, and be used to indicate the radial position of the carriage instead of the above-mentioned dial mechanism. In such a case, the dial mechanism may be eliminated altogether. A mechanism, suitable for use in such a player, for aiding carriage restoration during a caddy insertion will now be described.

As shown in FIG. 13, the aiding mechanism 470 comprises a first cam member 472 secured to the platform shaft 36 and a second, juxtaposed cam member 474 fixedly mounted on the coaxially shaft 408. The construction and location of the cam members are such that when the platform 34 is raised to the elevated position (FIG. 2), for example, to retrieve a record from the player, the platform-mounted cam member 472 allows the cam member 474 to shift to the left, as viewed at FIG. 13, whereby the clutch spring 428 is caused to relax reducing the slip clutch engagement force. The reduction in slip clutch engagement force permits slippage between the carriage driving pulley 404 and the turntable driven pulley 418 during restoration of the carriage by the caddy to the starting position when the platform is depressed, for example, to transfer a retained record to the turntable for playback, the slip clutch automatically reengages to provide the required carriage driving torque during playback.

Filed concurrently herewith are the following U.S. patent applications Ser. No. 964,531: (1) application, Ser. No. 964,531, of L. A. Torrington, entitled "VIDEO DISC PLAYER", (2) application, Ser. No. 964,537, of L. A. Torrington and J. A. Allen, entitled "VIDEO DISC PLAYER HAVING UNITARY RECORD HANDLING PLATFORM CONSTRUCTION", (3) application, Ser. No. 964,536, of J. A. Allen, entitled "CARRIAGE TRANSLATING APPARATUS FOR VIDEO DISC PLAYER", (4) application, Ser. No. 964,534, of F. R. Stave, entitled "VIDEO DISC PLAYER HAVING MANUAL SCANNING FACILITY", (5) application, Ser. No. 964,535, of F. R. Stave, entitled "APPARATUS FOR FACILITATING CARRIAGE RETURN IN VIDEO DISC PLAYER", (6) application, Ser. No. 964,532, of F. R. Stave, entitled "VIDEO DISC PLAYER HAVING RECORD SIDE IDENTIFICATION APPARATUS", (7) application, Ser. No. 964,533, of C. F. Coleman, entitled "VIDEO DISC PLAYER HAVING MODULAR CONSTRUCTION", (8) application, Ser. No. 964,530, of L. A. Torrington, entitled "MANUAL SCANNING MECHANISM FOR VIDEO DISC PLAYER", (9) application, Ser. No. 964,529, of L. D. Huff, entitled "TOGGLE MECHANISM FOR VIDEO DISC PLAYER", (10) application, Ser. No. 964,528, of L. A. Torrington, entitled "RECORD SIDE IDENTIFICATION APPARATUS FOR VIDEO DISC PLAYER", (11) application, Ser. No. 964,526, of L. A. Torrington and L. D. Huff, entitled "MECHANISM FOR AIDING CARRIAGE RETURN IN VIDEO DISC PLAYER", (12) application, Ser. No. 964,633, of L. A. Torrington, entitled "VIDEO DISC PLAYER HAVING ADJUSTABLE END-OF-PLAY SWITCH", (13) application, Ser. No. 964,643, of C. F. Coleman and N. L. Farley, entitled "CADDY-ACTUATED DECLUTCHING MECHANISM FOR VIDEO DISC PLAYER". Reference may be made to these applications for explanation of video disc player features that may advantageously be employed with the present invention.

What is claimed is:

1. A player for use with a disc record; said player comprising:
    (A) a housing into which a record is inserted;
    (B) a turntable for supporting and centering said record;
    (C) means for rotating said turntable;
    (D) a signal pickup for recovering prerecorded information from a turntable-supported record during playback;
    (E) a carriage for supporting said signal pickup;
    (F) means for guiding said carriage in said housing along a path;
    (G) common carriage translating means including a drive belt secured to said carriage and disposed about an idler pulley and a carriage driving pulley such that said drive belt extends parallel to said carriage path; the rotation of said carriage driving pulley in a forward direction and a reverse direction respectively causing motion of said carriage toward and away from the center of said turntable;
    (H) first means for utilizing said common carriage translating means for translating said carriage during playback toward said turntable center at a speed correlated to the speed of rotation of said turntable; said first utilizing means including (a) a turntable-driven pulley mounted coaxially with said carriage driving pulley, said turntable-driven pulley being capable of rotation in a forward and a reverse direction, (b) means coupled to said turntable rotating means for rotating said turntable-driven pulley in said forward direction, and (c) slip clutch means interposed between said carriage driving pulley and said turntable-driven pulley;
    (I) second means for utilizing said common carriage translating means for translating said carriage toward and away from said turntable center at a speed independent of the speed of rotation of said turntable; said second utilizing means including manually actuated means coupled to said carriage driving pulley for variably controlling the speed and the direction of rotation of said carriage driving pulley, whereby said carriage is translated selectively toward and away from said turntable center at a variable speed; wherein said slip clutch means interposed between said carriage driving pulley and said turntable-driven pulley permits wresting of control of said carriage driving pulley from said turntable-driven pulley by said manually actuated means upon operation thereof;
    (J) a member mounted to said housing, independent of said means for rotating said turntable-driven pulley, providing a surface for contacting said turntable-driven pulley; and
    (K) means for urging engagement between said contacting surface of said member and an engaging surface of said turntable-driven pulley to provide a drag force of a given magnitude; said magnitude of said drag force being such as to deter rotation of said turntable-driven pulley in said reverse direction during rotation of said carriage driving pulley in said reverse direction effected by operation of said manually actuated means, whereby translation of said carriage by said first utilizing means toward said turntable center is resumed upon cessation of operation of said manually actuated means without delay due to effects of backlash in said first utilizing means.

2. A player as defined in claim 1 wherein said carriage driving pulley and said turntable-driven pulley are loosely mounted on a shaft for motion independent thereof; wherein said member also serves to rotatably support the end of said shaft adjacent to said turntable-driven pulley.

3. A player as defined in claim 2 wherein said means for urging engagement between said surfaces comprises a coil spring disposed about said shaft.

4. A player as defined in claim 3 including a friction surface secured to one of said surfaces.

5. A player as defined in claim 4 wherein said slip clutch means includes second means for urging engagement between a surface of said carriage driving pulley and an additional surface of said turntable-driven pulley juxtaposed therewith.

6. A player as defined in claim 5 wherein said slip clutch means further includes a second friction surface secured to one of said juxtaposed surfaces.

7. A player as defined in claim 6 wherein said second means for urging engagement between said juxtaposed surfaces comprises a second coil spring also disposed about said shaft.

8. A player as defined in claim 7 wherein said turntable-driven pulley has teeth disposed on the periphery thereof; wherein said means for rotating said turntable-driven pulley comprises a toothed play belt having a portion in engagement with said toothed periphery of said turntable-driven pulley.

9. A player as defined in claim 8 wherein said carriage driving pulley has a portion with teeth disposed on the periphery thereof; wherein said manually actuated means includes a toothed search belt having a portion in engagement with said toothed periphery of said portion of said carriage driving pulley.

10. A player as defined in claim 9 wherein said manually actuated means further includes a thumbwheel and a toothed pulley coaxially mounted for rotation therewith; said toothed search belt having a further portion disposed in engagement with said coaxially mounted toothed pulley.

11. A player as defined in claim 10 wherein said carriage driving pulley has a second portion with teeth disposed on the periphery thereof; said idler pulley having teeth disposed on its periphery; said drive belt having teeth in engagement with said toothed periphery of said second portion of said carriage driving pulley and said toothed periphery of said idler pulley.

* * * * *